(12) United States Patent
Buggele et al.

(10) Patent No.: US 6,470,672 B1
(45) Date of Patent: Oct. 29, 2002

(54) MINIMALLY INTRUSIVE AND NONINTRUSIVE SUPERSONIC INJECTORS FOR LANTR AND RBCC/SCRAMJET PROPULSION SYSTEMS

(75) Inventors: Alvin E. Buggele, Milan, OH (US); John R. Gallagher, Strongsville, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/909,170

(22) Filed: Jul. 16, 2001

Related U.S. Application Data

(60) Provisional application No. 60/219,002, filed on Jul. 17, 2000.

(51) Int. Cl.[7] ................................................. F02K 7/08
(52) U.S. Cl. .......................... 60/270.1; 60/247; 60/740; 60/767; 239/434
(58) Field of Search .......................... 60/218, 247, 740, 60/767, 768; 239/434, 600

(56) References Cited

U.S. PATENT DOCUMENTS

| | | |
|---|---|---|
| 5,202,525 A | 4/1993 | Coffinberry |
| 5,220,787 A | 6/1993 | Bulman |
| 5,280,705 A | 1/1994 | Epstein |
| 6,267,585 B1 * | 7/2001 | Suttrop ........................ 431/354 |

OTHER PUBLICATIONS

NASA/TM—1999–208893: Buggele, Aug. 1999.
NASA/TM 107533: Buggele, Jul. 27, 1997.

* cited by examiner

Primary Examiner—Charles G. Freay
Assistant Examiner—John F Belena
(74) Attorney, Agent, or Firm—Kent N. Stone

(57) ABSTRACT

A family of supersonic injectors for use on spaceplanes, rockets and missiles and the like is disclosed and claimed. Each injector maintains a specific constant (uniform) Mach number along its length when used while being minimally intrusive at significantly higher injectant pressure than combustor freestream total pressure. Each injector is substantially non-intrusive when it is not being used. The injectors may be used individually or in a group. Different orientations of the injectors in a group promotes greater penetration and mixing of fuel or oxidizer into a supersonic combustor. The injectors can be made from single piece of Aluminum, investment cast metal, or ceramic or they can be made from starboard and port blocks strapped together to accurately control the throat area. Each injector includes an elongated body having an opening which in cross section is an hour glass (venturi shaped) and the opening diverges in width and depth from the bow section to the stem section of the opening.

29 Claims, 13 Drawing Sheets

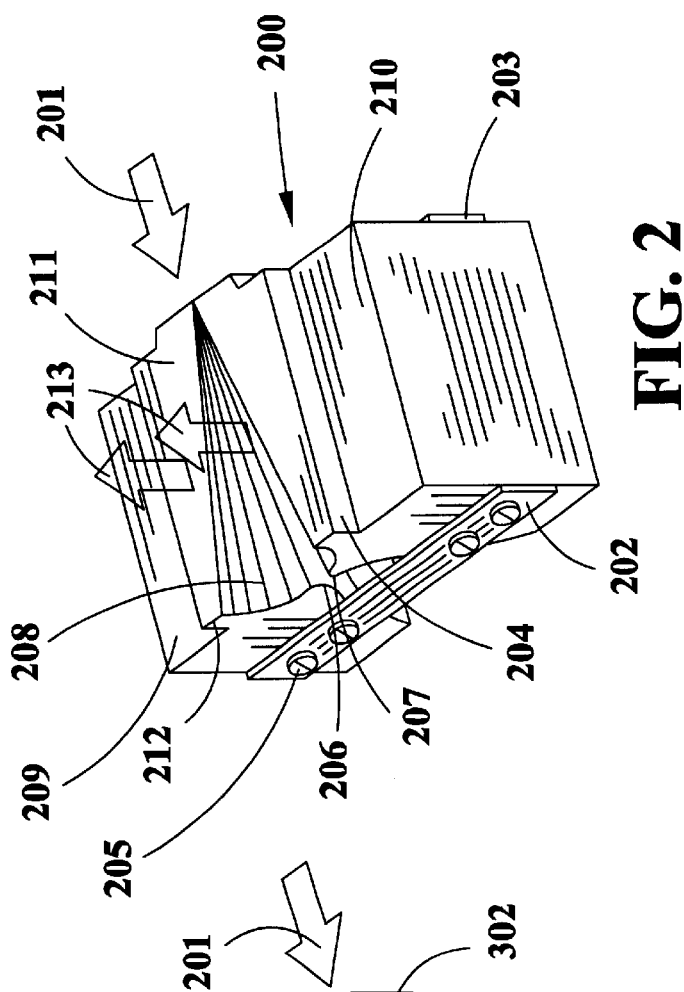
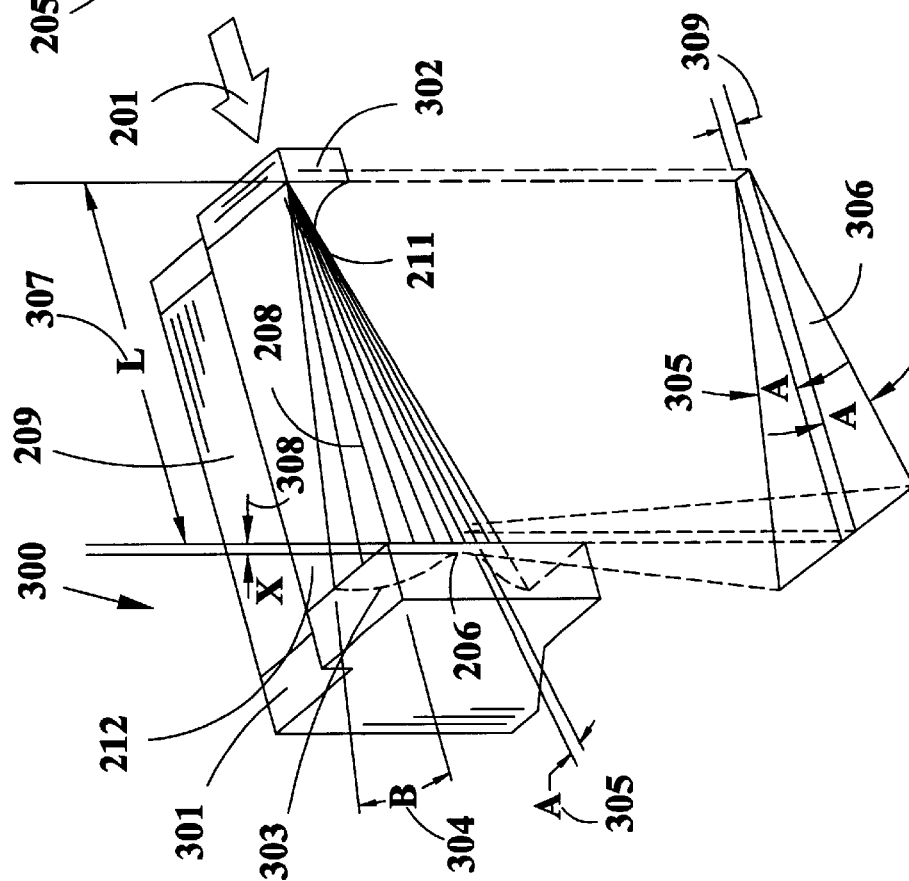
FIG. 2
FIG. 3

Nominal Dimensions For Injectors

| Mach number | X (308) | Length L, in. | Discharge half-angle, B deg | Throat half-angle, A deg | Injection area in.² (306) |
|---|---|---|---|---|---|
| 2.0 | 0.0330 | 1.503 | 2.14 | 1.11 | 0.0495 |
| 3.0 | 0.0132 | 3.750 | .86 | .2 | 0.0495 |
| 4.0 | 0.0052 | 9.500 | .28 | .03 | 0.0495 |

FIG. 3A

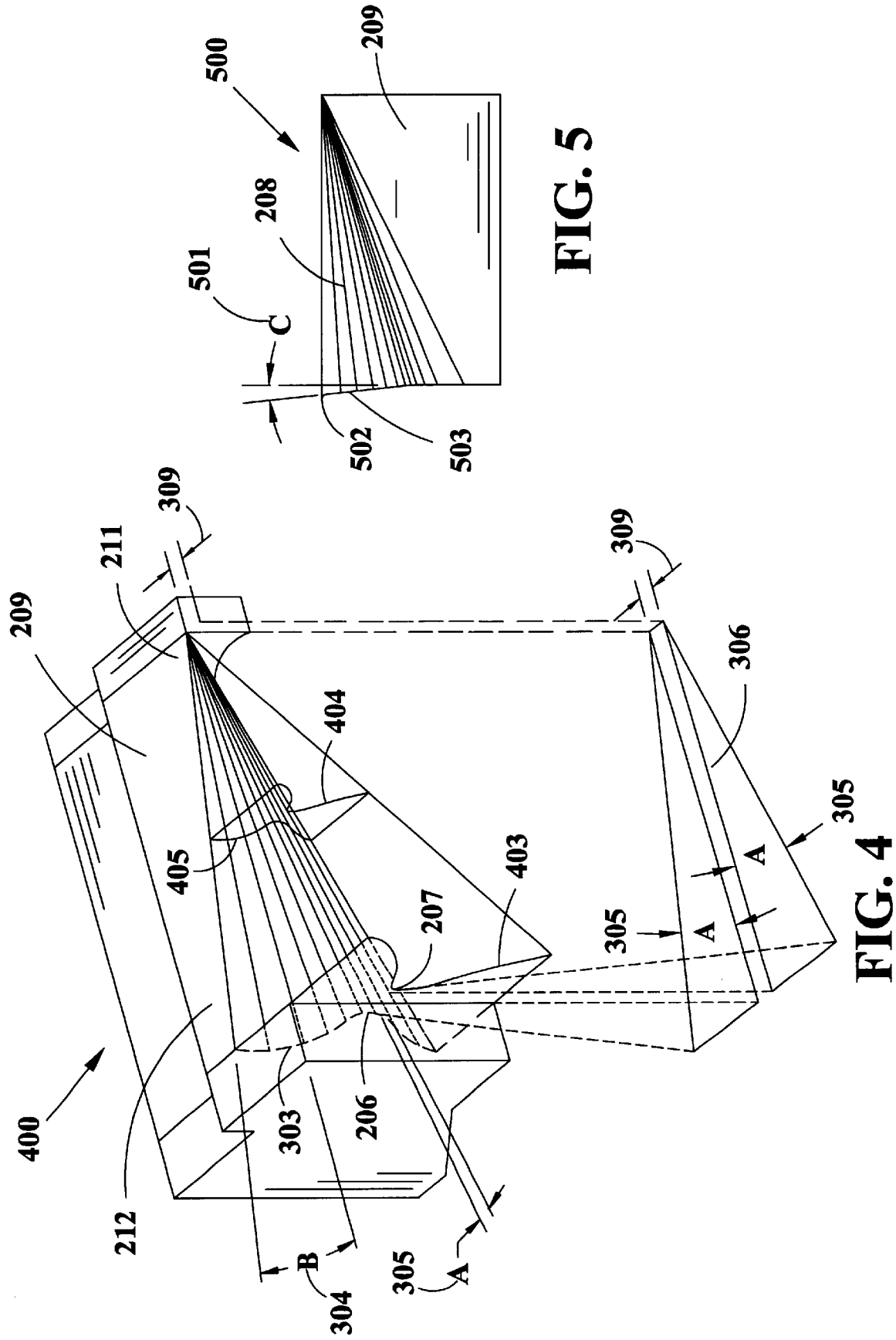

MINIMALLY INTRUSIVE AND NONINTRUSIVE SUPERSONIC INJECTORS FOR LANTR AND RBCC/SCRAMJET PROPULSION SYSTEMS

This application claims priority of provisional patent application No. 60/219,002 filed Jul. 17, 2000 entitled MINIMALLY INVASIVE SUPERSONIC INJECTORS FOR AUGMENTED ROCKET AND RBCC/SCRAMJET PROPULSION SYSTEMS.

ORIGIN OF THE INVENTION

The invention described herein was made by employees of the United States Government, and may be manufactured and used by the government for government purposes without the payment of any royalties therein and therefor.

FIELD OF THE INVENTION

The invention is a minimally intrusive slender supersonic injector flush mounted to the wall of a combustor through which combustion air flows. When not in use, the invention is substantially nonintrusive. The invention may also be used to control the attitude of a spaceplane above the atmosphere of the earth.

BACKGROUND OF THE INVENTION

A typical scramjet engine includes a combustor having a chamber wherein a fuel-air mixture moving at supersonic speed is burned. At least one fuel injector directs supersonically-moving fuel such as pressurized hydrogen into the chamber. The engine also includes an air inlet, which delivers compressed supersonically-moving air to the combustor chamber and further includes an exhaust nozzle which channels the burning gas out of the combustor chamber to help produce the engine thrust. The fuel injector discharge orifices are the openings in the combustor chamber to which fuel is delivered by a fuel system which may includes tanks, pumps and conduits.

State-of-the-art flush mounted circular and wedge injectors, similar to those proposed for use in scramjet (supersonic combustion ramjets) and rocket-based, combined-cycle (RBCC) air breathing space planes or missiles and liquid oxygen-augmented nuclear thermal rocket (LANTR) proposed Mars space transportation propulsion system, are intrusive when not used (generating significant shock disturbances throughout the system) and when used, create a high heat flux near the origin of injection due to a created separation bubble in front of the jet and/or recirculation eddies just downstream of the jet. Penetration and adequate mixing of exiting jet or jets in the main supersonic flow that supports a burnable/stable combustion process before being discharged is difficult to obtain.

RBCC/Scramjet/LANTR propulsion systems require fuel and/or oxidizer augmentation injectors that fulfill specific penetration, mixing, and uniform stable burning needs within the shortest distance for a wide range of supersonic cross flow Mach numbers when in use, but must be minimally intrusive when not in use. A flush mounted jet in a supersonic cross flow is quickly deflected by aerodynamic effects until the plume becomes parallel to the combustor surface freestream cross flow but does not mix adequately to support stable supersonic combustion. A plyup/ramping in the separated boundary layer occurs in front of the blockage produced by the state-of-the-art jet plume bringing the regional subsonic boundary layer flow nearly to rest. A recirculation pattern occurs withing this region enlarging the angular separated boundary layer plyup. A large bow pressure disturbance wave results as reported in NASA/TM-1999-208893 which is incorporated by reference hereto. This phenomena continues to persist affecting stable RBCC/scramjet/combustion performance to date regardless of the prior art injector angle and/or whether such injector is followed by a high drag mixing cavity.

U.S. Pat. No. 5,202,525 issued to Coffinberry on Apr. 13, 1993 states that the mixing of hydrogen fuel in a scramjet combustor is a difficult process since the compressed airfow is flowing at supersonic velocities with substantial momentum and the fuel injected into the combustor has relatively low momentum. Coffinberry further states that oxygen and nitrogen molecules contained in the air have relatively large mass inertia which typically easily overcome the relatively low mass inertia of molecular hydrogen in the fuel. Accordingly, hydrogen fuel has the tendency to simply follow the stream of supersonic airflow without significant mixing. In order to obtain acceptable combustion in the scramjet combustor, acceptable mixing of the fuel and supersonic airflow must be obtained. See, the '525 patent, col. 1, lns. 29–42. Supersonic combustors face the further challenge that the fuel must be fully mixed within the combustor in a length as short as possible.

U.S. Pat. No. 5,280,705 issued Jan. 25, 1994 to Epstein et al. discloses an intermittent admission of the fuel to the airflow to promote enhanced combustion and to minimize the heat load on the combustor.

U.S. Pat. No. 5,220,787 issued to Bulman Jun. 22, 1993 discloses a locally pressure matched injector. Namely, the exit pressure of the injector is matched to the cross-flow pressure of the combustion air. By matching the exit pressure of the fuel jet to the pressure surrounding the fuel jet, a jet of the narrowest width is produced having the highest momentum. Bulman cites F. S. Billig et al and other researchers (Billig, F. S., Orth, R. C., Lasky, M., "A Unified Analysis of Gaseous Jet Penetration," American Institute of Aeronautics and Astronautics Journal, Vol. 9, No. 6, Jun. 1971, pp. 1048–1058, that studied the penetration and mixing of fuel jets in cross flows in the 1960's. Billig et al. studied the effects of introducing fuel through both a circular opening and a noncircular opening. According to Bulman, the use of these noncircular openings by Billig did not have the desired effect, namely, improved penetration and mixing because the pressure matching was only performed on an average basis.

The Bulman '787 patent cites the need for better fuel mixing which improves the combustion efficiency of the engine. Bulman recognized prior attempts to get more fuel in the air stream by simply pumping more fuel therein. However, according to Bulman, air/fuel mixing is not well served by having a few large injectors because the result is a large over-fueled region surrounded by underfueled air. See, for example, the Bulman '787 patent at col. 1, lns. 37–45. Bulman cites the need for better mixing in relation to the gap between injectors. In other words, according to Bulman, better penetration and mixing enables the use of multiple injectors spaced closer together which promotes more thorough and consistent combustion in a smaller space within the engine.

Bulman '787 discloses a fuel injector having at least one fuel inlet port, throat and fuel exit port serially connected and which in combination produce the local pressure match as well as a low drag shape. Bulman cites calculation of the throat contour to produce the correct area ratio to achieve the local pressure matching condition in that the fuel jet exiting from the fuel injector from the proximate end is lower in velocity and therefore at a higher pressure while the fuel jet exiting from the injector body near the distal end has a higher velocity and lower local pressure. See, col. 10, lns. 39–48, of the Bulman '787 patent. The ratio of the exit width to the throat width determines the local area ratio. Bulman '787 in FIG. 13A thereof cites an example having a 2.25 degree throat area half angle.

The Bulman '787 seven (7) degree half angle wedge and its cascade injector version reduced forward hot spots somewhat and slightly increased penetration. However, as tested this injector consistently produced a non-uniform velocity profile jet (Mach 2.1 to 1.67) from bow to stern over a wide range of injectant pressures. State-of-the-art scramjet engines presently use groups of normal or angled hole injectors (quarter inch diameter) just forward of high drag/step mixing cavities or the Bulman '787 wedge injectors positioned on a strut within the combustor duct geometry.

All prior art supersonic injectors are intrusive when not used, creating a not to be ignored pressure wave and shock disturbances that propagate downstream the combustor duct. When supersonic flush injection is used within or into supersonic crossflow a large pressure wave, shock disturbances and hot spots occur near the jet. See, NASA/TM 107533, NASA/TM 1999-208893, and/or NASA/TM-2001-210951.

State-of-the-art hole injectors exhibit a forward bow wave which tends to separate extensively forward of the bow shock and creates a large disturbance (circulations and hot spots) downstream. Bulman's structure reduces the forward disturbance significantly but does not eliminate it. Downstream of the Bulman injector the disturbance is significant with eddies and potential hot spots existing, reference NASA/TM-2001-210951 FIGS. 5(a), 5(b) and 5(c), composite PLIF (PLANAR LASER-INDUCED FLUORESCENCE) plume images 1.50 and 2.00 inches downstream of the jets origin of injections.

The instant invention will be better understood when reference is made to the following Summary of the Invention, Brief Description of the Drawing, Description of the Invention and Claims.

SUMMARY OF THE INVENTION

The invention is a slender fuel injector comprising an elongated body flush mounted to the wall of a combustor. An opening having a substantially hour-glass shape in cross section extends from bow to stern of the injector. The substantially hour glass-shape in cross section may also be described as a venturi shape in cross section. Bow, front, fore and proximate are terms used to describe the portion of the injector which is first traversed by the incoming cross flow of combustion air. Stem, back, aft and distal are terms used to describe the portion of the injector which are last traversed by the incoming cross flow of combustion air.

Typical fuels include hydrogen, JP5, methane, propane, methylcyclohexane, pentaborane and mixtures of these. For typical oxidizer augmentation application, Liquid Oxygen Augmented Nuclear Thermal Rocket (LANTR), near space-air breathing supersonic/hypersonic combustion application, gaseous oxygen or liquid oxygen may be injected using the injectors of this invention.

The fuel injector of the present invention may be used in a combustor in different configurations, for example, in a convex surface, in a concave surface, or they may be curved (i.e., arced). Additionally, they may be curved and used in a convex and/or in a concave surface. Several injectors will be used in a combustor simultaneously. Straight line injectors can be angled or arced to starboard followed by downstream rows angled or arced to port such that penetration from the first row becomes further lifted by displacement by the second row while undergoing augmented mixing by the counter swirl patterns setup by the second row. In addition, the injectors may be flush mounted in a concave or convex surface.

The injectors may be used in other applications such as to control the attitude of a spaceplane operating above the atmosphere of the earth. In this application the injector may emit air or other compressed gas to control the orientation of the spaceplane. The injectors may also be used to supply oxidizers for combustion.

The opening in the elongated body of the injector includes a throat which diverges (increases) in width and depth from bow to stern. An hour glass shape (in cross section) opening diverges (increases) in width and depth from bow to stern. A starboard (right) and a port (left) block comprise the injector which is flush mounted to the combustor. Spacers fore and aft are employed to control the precise throat area of the injector. The throat is defined as the cross sectional area of the injector at the area of minimum cross section of the venturi or hour glass.

The surface of the injector is machined from 2124 Aluminum so as to obtain a 16 RMS (root mean square) surface roughness. The injector may be fabricated from various metals and/or ceramics. Direct metal deposition technology may be used to form the injectors. A one-ten thousandths stepover machining process is employed to obtain the 16 RMS surface roughness. Injectors of the present invention may be made from metal such as aluminum or stainless steel or they may be made from the investment casting process. Aluminum has better machinability than stainless steel. The injectors may be made from ceramics. Injectors may be made from an integral piece of material or they may be made in halves and used in conjunction with spacers. The injectors may also be made from the investment casting process in an integral piece.

The injectors of the invention are Mach number specific. A family of injectors may be used in a combustor to accommodate various conditions (altitude and velocity). In general, as the Mach number of the cross flow increases, the throat spacing from one side (starboard side) of the injector to the other side (port side) of the injector decreases and the length of the injector increases. In other words, a general characteristic of the injector is that it has a long and slender throat which is formed in an elongated body.

The invention creates only a minute disturbance when injecting fuel or oxidizer because it is slender and has a constant (uniform) injection velocity from bow to stern. The half angle of the throat area for the instant invention is 1.11 degrees for a Mach 2 injector and is 0.03 degrees for a Mach 4 injector. As the Mach number of the injector increases the half angle of the throat area decreases and the length of the injector increases. It is anticipated that the injectors of the instant invention will be used in air breathing flight vehicle applications that achieve speeds at least as high as Mach 25 to Mach 30. Compressed air velocity/flow within combustors for these applications will be high supersonic to low hypersonic (Mach 4.5 to Mach 7.0) speed.

The uniform velocity of the injectant penetrates farther into the supersonic mainstream cross flow with better dispersion and mixing beginning at the exit plane of the injector. The fuel injector includes a stern section which includes a stern wall. The stern wall is angled in the direction of the cross flow of the combustion air so as to substantially eliminate any disturbance of the injector when not in use. Preferably, the stern wall is angled 5 to 10 degrees in the direction of the cross flow of the combustion air. A fan radius of approximately 0.0864 inches is present on the stern wall and the flush portion of the injector to allow a (Prandt-Meyer expansion) injection release.

The momentum flux ratio, J, is used to characterize the penetration of a jet into a cross flow. The momentum flux ratio, J, is defined as:

$$J = \frac{\gamma_{inj} p_{inj} M_{inj}^2}{\gamma_{tun} p_{tun} M_{tun}^2}$$

where γ is the ratio of specific heat for air, p is pressure and M is the injector Mach number, and the subscripts "tun" and "inj" refer to the tunnel flow and the injectant flow, respectively. While the momentum flux ratio is important and may be increased by raising the injection pressure and/or the Mach number, it has been discovered that it is very important to distribute the injectant with uniform velocity from the bow to the stern of the injector thereby penetrating farther (wider and higher) into the supersonic mainstream cross flow. In the injector of the instant invention J, the momentum flux ratio, is uniform from bow to stern. J is uniform from bow to stern for all of the injectors of the instant invention regardless of Mach number. Uniform velocity along the slender injector of the invention (as tested in the supersonic wind tunnel at the NASA Glenn Research facility in Cleveland, Ohio) resulted in better dispersion as compared to the prior art injector of Bulman (7 degree half angle wedge of the Bulman '787 patent) with the same mass flow.

Substantial wind tunnel analyses have been performed on the instant invention, the prior art Bulman '787 patent 7 degree half-angle wedge and the prior art (0.25 inch) quarter inch diameter hole. The invention virtually eliminated potential hot spots (high heat flux) forward, aft and around the injection sites and avoided the classic separation bubble that forms in front of a normal jet and recirculation eddies that form downstream of the jet. The elimination of these disturbances led to improved supersonic surface injection, penetration with uniform flow, and greater reliability.

A primary objective is to provide a slender flush injector which has better penetration, mixing and stable burning quickly without the high drag, intrusive, pressure wave, shock generating disturbances and resultant combustion instability defects present with state-of-the-art injectors and injector systems. A second purpose or objective of the invention was to substantially totally eliminate any not to be ignored intrusive/drag effects when the injector or injectors are not being used.

Another object of the instant invention was to achieve a wide range of supersonic flow injectors having uniform supersonic flow velocity through out the entire length of a non-intrusive jet with increased penetration into the cross flow and with better mixing over a large operational range of injectant pressures including injectant pressures which significantly exceed combustor, freestream (crossflow) total pressure.

Another object of the instant invention was the provision of a family or series of Mach number and mass flow specific supersonic slender injectors that have superior penetration and mixing capabilities in a wide range of supersonic crossflow conditions while substantially eliminating the intrusiveness generated flow disturbances, separation bubble, hot spots, pressure waves, shocks and recirculation eddies associated with the quarter inch hole injectors and the wedge configuration of the Bulman '787 patent.

A better understanding of the invention will be had when reference is made to the following BRIEF DESCRIPTION OF THE DRAWINGS, DESCRIPTION OF THE INVENTION and CLAIMS which follow hereinbelow.

BRIEF DESCRIPTION OF THE DRAWINGS

FIG. 2 is a perspective view of an injector of the instant invention and spacing straps;

FIG. 3 is a perspective view of the port side of an injector of the instant invention together with end plates fore and aft;

FIG. 3A is a table illustrating nominal dimensions for some (Mach 2, 3 and 4) of the injectors of the instant invention;

FIG. 4 is a perspective view of the injector of FIG. 3 illustrating the cross sectional shape of the opening of the injector;

FIG. 5 is a side view of another embodiment of the port side of an injector illustrating a tapered aft section to achieve nonintrusiveness;

A better understanding of the drawings will be had when reference is made to the DESCRIPTION OF THE INVENTION and the CLAIMS which follow hereinbelow.

DESCRIPTION OF THE INVENTION

Figure 1:
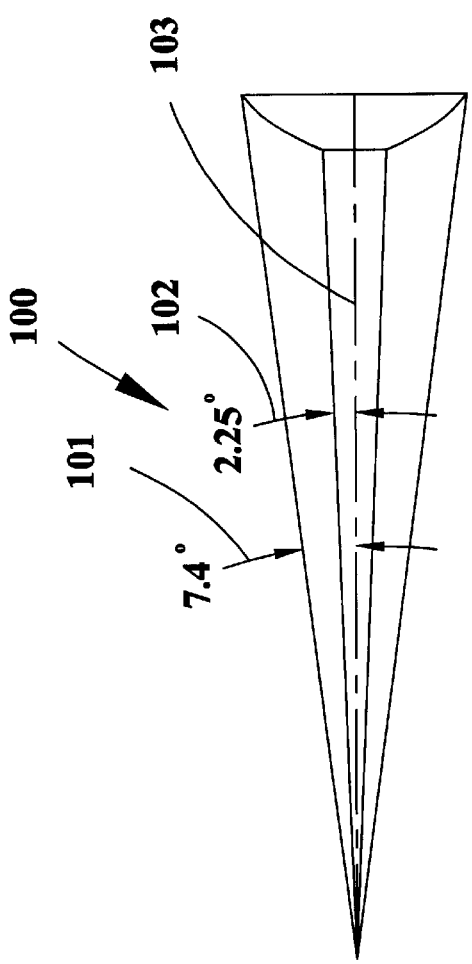
FIG. 1 is a plan view of the prior art injector of Bulman.
Figure 1A:
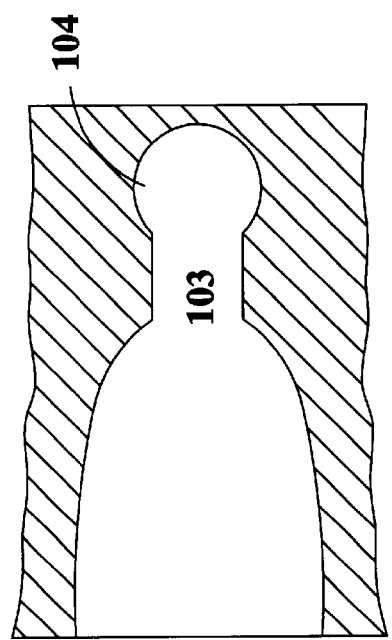
FIG. 1A is distal end sectional view of the prior art injector of the Bulman '787 patent.

FIG. 1 is a plan view of the prior art injector of Bulman. Reference numeral 101 indicates the 7.4 degree half-angle wedge construction with a 2.25 degree half angle throat. The length of this injector is approximately 0.8 inches long. FIG. 1 is a substantial copy of FIG. 13A of the Bulman '787 patent. Reference numeral 103 is the throat of the wedge injector. FIG. 1A is a cross sectional of the distal end of the prior art injector of the Bulman '787 patent. The distal end of FIG. 1 is the right side of the device and reference numeral 104 represents a fuel supply line for feeding the throat 103 of the injector.

FIG. 2 is a perspective view of an injector 200 of the instant invention, bow spacing strap 203 and stern spacing strap 202. Straps 203 and 202 constitute a compensation spacer gap. Screws 205 hold the spacing straps in place. Once assembled the injector is flush mounted into a combustion chamber. Preferrably, for machining purposes the injector is made from 2124 Aluminum as it has been found that a 16 RMS (root mean square) surface finish is obtainable and desirable. Lines 208 indicate contour lines of a one ten thousandths machining process employed. Lines 208 and corresponding lines indicated in the drawings are for illustration purposes and are not visible or seen on the actual injectors.

Still referring to FIG. 2, reference numeral 201 indicates an arrow signifying the direction of air combustion air flow. Combustion air flow is sometimes referred to herein as cross flow or free stream flow. It is the compressed airflow from the atmosphere which is generated from the flight of the spaceplane or other device. Shoulder 204 on starboard block 210 enables flush mounting of the injector into a combustion chamber. Fuel as representing by arrows 213 is pumped through the injector usually in gaseous form. The bottom of the injector communicates with a source of fuel which is not shown. An unnumbered corresponding shoulder enabling flush mounting is also present on the port block 209.

For machining purposes it is easier to construct the injector from two pieces, a starboard block and a port block. Throat area formed between reference numeral 206 on the port block and reference numeral 207 on the starboard block is controlled through the use of straps 202 and 203. These straps enable spacing between the port and starboard blocks and hence provide the exact throat area desired which is important for controlling the mass of fuel injected with a corresponding injectant pressure. Normal machining tolerance for the slender supersonic injectors are inadequate in order to create and maintain the desired throat area. As such spacers are employed to accurately control the throat area. Further improvement in plume penetration is possible by using slightly larger or smaller spacers separating the injector blocks on specific applications (refer to FIG. 3). The injectors of the instant invention may be made from a single piece of metal or ceramics. Investment casting may be used to obtain an injector which is an integral piece. Supersonic cross air flows first traverse the bow section 211 of the injector and last traverse the stern section 212 of the injector.

FIG. 3 is a perspective view 300 of the port side or port block 209 of an injector together with end plates (or caps) fore 302 and aft 301. FIG. 3A is a table illustrating nominal dimensions for some (Mach 2, 3 and 4) of the injectors of the instant invention. From FIGS. 3 and 3A it can readily be seen that angle A as indicated by reference numeral 305 is only 1.11 degrees for the Mach 2 injector, 0.2 degrees for the Mach 3 injector and 0.03 for the Mach 4 injector. These openings yield the same area 306 as does a quarter inch diameter hole, namely, 0.0495 square inches. The length, L, as indicated by reference numeral 307 is 1.503 inches, 3.750 inches and 9.500 inches for the Mach 2, 3 and 4 injectors, respectively. The injectors of the present invention are long and slender and yield an injectant having a uniform velocity and momentum flux along their length resulting in better dispersion, mixing and burning of the fuel.

Referring again to FIG. 3, angle A as represented by reference numeral 305 is indicated in two places. Projection 306 of the throat area is an enlargement and illustrates the throat half angle "A" well. Discharge half angle B as indicated by reference numeral 304 is also indicated in FIG. 3 and values therefor are indicated in FIG. 3A. Line 303 illustrates one half of an hour glass shape, sometimes referred to herein as a venturi shape, at the stern. Reference numeral 308 indicates the distance X between the centerline of the injector and the throat at its largest point or cross section.

FIG. 4 is a perspective view 400 of the injector of FIG. 3 illustrating the cross sectional shape of the opening of the injector being an hour glass shape (or venturi shape) as indicated by reference numerals 303, 403 for the cross section at the stern and as indicated by the reference numerals 405, 404 for the cross section midway between the bow and the stern. FIG. 4 illustrates that from bow 211 to stern 212 the opening having a cross sectional shape of an hour glass (venturi) becomes progressively wider and deeper. Gas under pressure is communicated to the bottom portion of the opening through structure which is understood by those skilled in the art and is not shown herein because it is not necessary for an understanding of the invention. It will be noticed when referring to FIG. 3 and FIG. 4 that area 306 is not triangular but is rather a parallelogram which accommodates for the spacing straps not shown in FIG. 3 and 4.

Referring again to FIGS. 3 and 4, both of which illustrate a total projection of the throat area 306. Throat area 306 includes a compensation spacer gap 309 which is, for example, 0.0037 inches for a Mach 2 injector. This spacer gap is necessary to achieve a 0.049 square inch throat area 306. The compensation spacer gap 309 may range between 0.0005 and 0.005 inches to account for fabrication deviations associated in Mach 2, 3, 4, etc. injectors. A slightly larger or smaller compensation spacer gap 309 for a specific injector will increase or decrease the uniform velocity from bow to stern which may have additional benefits to LANTR, SCRAMJET/RBCC engine designs.

FIG. 5 is a side view 500 of another port block of an injector illustrating a tapered stern wall 503 to achieve virtual nonintrusiveness. Angle C as represented by reference numeral 501 is preferably between 5 and 10 degrees and fan radius 502 is 0.0864 inches is present on the stern wall and the flush portion of the injector to allow a (Prandtl-Meyer expansion) injection release. In this way during those times when the injector is not in use the intrusiveness of the injector is minimized.

Figure 6:
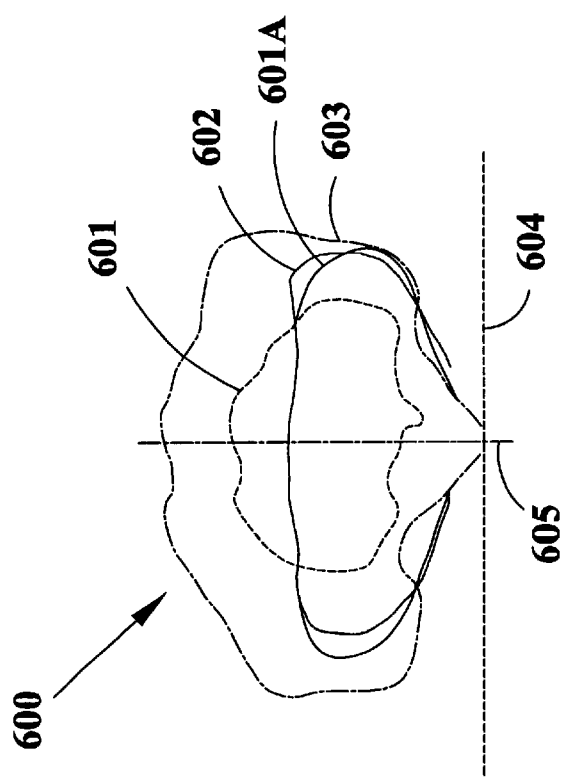
FIG. 6 is an exit plane comparison of jet plumes of prior art injectors and the injector of the present invention.

FIG. 6 is an exit plane comparison 600 of jet plumes 601, 602 of the prior art injectors and the jet plume 603 of the injector of the present invention. The comparison was made by injecting into a supersonic wind tunnel at a total pressure of 42.5 psia. Mass flow was the same for each injector. Floor 604 and centerline 605 of the supersonic wind tunnel are illustrated in FIGS. 6–9. Reference numeral 601 is the exit plane plume of the prior art 0.25 inch diameter hole with an injectant velocity of Mach 1.4, J=3.06, at an injection pressure of 22.5 psia. Reference numeral 602 is the exit plane plume of the prior art Bulman '787 patent 7 degree half angle wedge having a Mach 2.08 to 1.63 jet (i.e., non uniform jet, M=1.87 at 0.5L, 42.5 psia injection pressure) along its 0.82 inch length. Reference numeral 603 is the Mach 2 configuration of the instant invention having an actual uniform Mach number of 1.93 from bow to stern along its 1.503 inch length with J=5.23. Better width dispersion was noted for the 0.25 inch diameter over that of the Bulman 602 injector hole with an injection pressure of 45.9 psia and J=4.68 as represented by reference numeral 601A. The exit plane dispersion 603 of the plume by injector of the instant invention in both width and height was considerably greater than that of the prior art injectors. The width of the dispersion of the injector of the instant invention was between 19 to 22% better than the prior art at the exit plane. The plumes diagrammatically represented in FIGS. 6–9 are Planar Laser-Induced Fluorescence (PLIF) images made from supersonic wind tunnel studies made on the prior art and the instant invention. See, NASA/TM-2001-210951, FURTHER COMPARISONS OF SUPERSONIC INJECTORS FOR LANTR AND RBCC/SCRAMJET PROPULSION SYSTEMS, by A. E. Buggele, R. G. Seasholtz and M. B. Vickerman, National Aeronautics and Space Administration, Glenn Research Center, Cleveland, Ohio 44135 which is incorporated herein by reference hereto.

Figure 7:
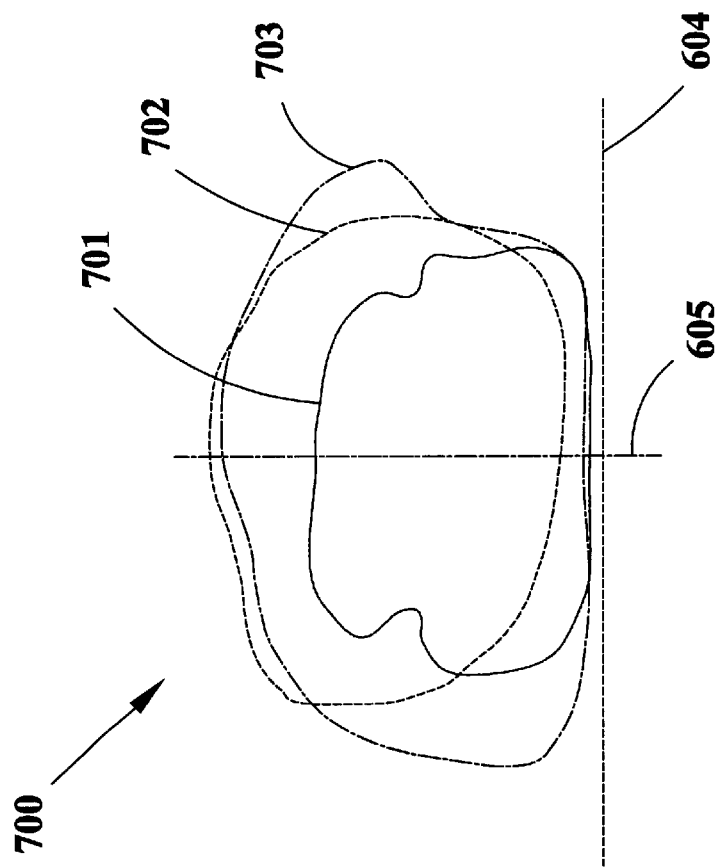
FIG. 7 is a comparison of jet plumes of prior art injectors and the injector of the present invention at a plane 2.00 inches downstream of the injectors.

FIG. 7 is a comparison 700 at a plane 2.00 inches downstream of the injectors of the jet plumes of the prior art injectors and the injector of the present invention. Reference numeral 701 represents the plume from the 0.25 inch diameter hole 2.00 inches downstream thereof. Reference numeral 702 represents the plume from the seven degree half angle wedge of Bulman and reference numeral 703 represents the plume from the slender Mach 2 injector of the instant invention. The Mach 2 injector of the instant invention has a plume that is approximately 46% wider than the quarter inch diameter hole having a Mach 1.4 jet emanating therefrom. Similarly, the Mach 2 injector of the instant invention has a plume that is approximately 24% wider than the 7 degree half angle wedge of Bulman.

Figure 8:
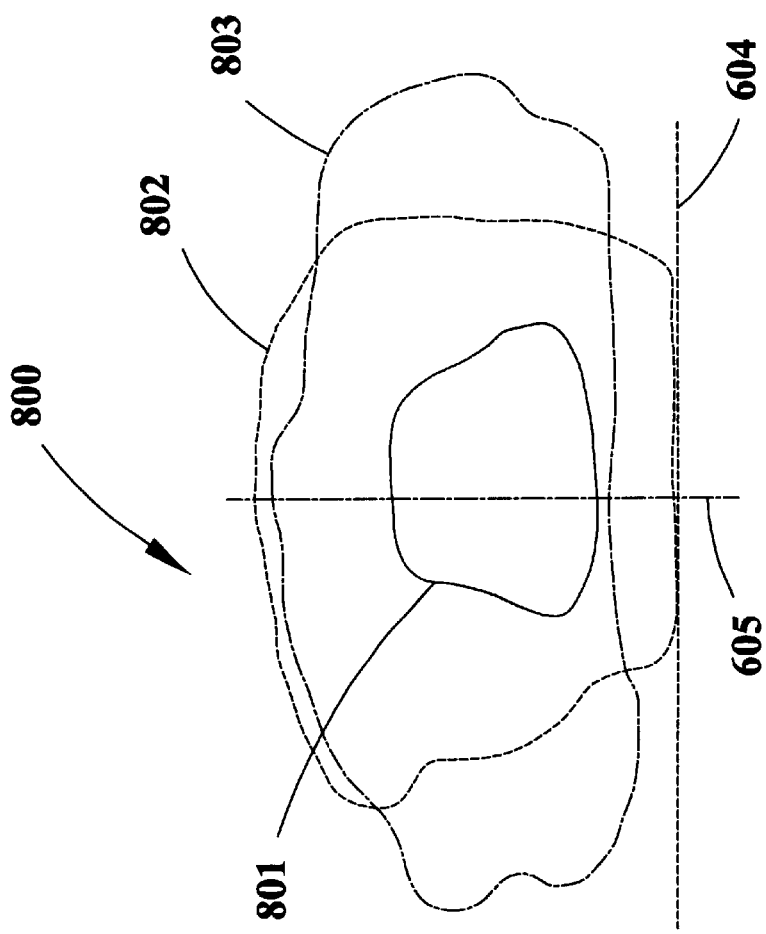
FIG. 8 is a comparison of jet plumes of prior art injectors and the injector of the present invention at a plane 3.00 inches downstream of the injectors.

FIG. 8 is a comparison 800 at a plane 3.00 inches downstream of the injectors of jet plumes of prior art injectors and the injector of the present invention. Reference numeral 801 indicates the plume from the 0.25 inch diameter hole (Mach 1.4), reference numeral 802 indicates the plume of the Bulman wedge, and reference numeral 803 represents the plume from the slender Mach 2 injector of the instant invention. The plume 803 was partially extrapolated on the extreme right hand side of FIG. 8 as the PLIF image was not complete. The plume 803 of the instant Mach 2 invention is 150% wider than the plume 801 of the quarter inch diameter hole and is 29% wider than the plume 802 of the Bulman wedge at 3.00 inches downstream from the exit plane.

Figure 9:
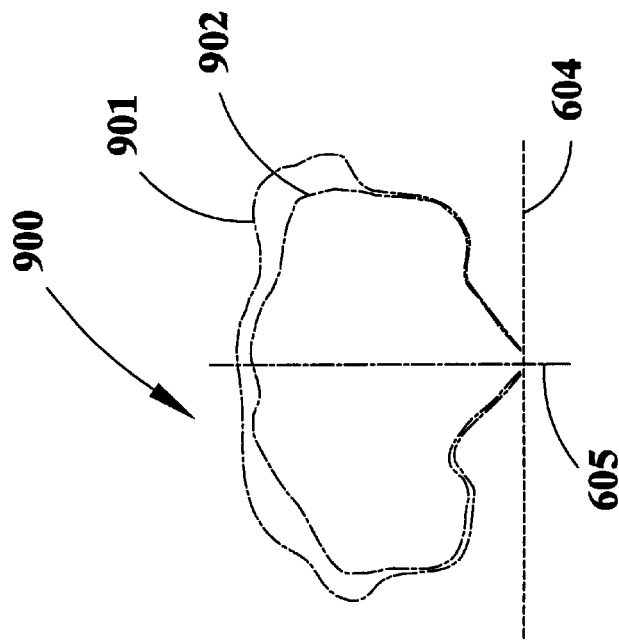
FIG. 9 is a an exit plane comparison of jet plumes of the injector of the present invention for two injection pressures.

FIG. 9 is an exit plane comparison 900 of jet plumes of the Mach 2 injector of the present invention (1.50 inches from the origin of injection) for two injection pressures, 42.5 psia (reference numeral 901) and 63.8 psia (reference numeral 902). Plume width increased 12%, penetration increased 8%, and J increased 28% with a 50% increase in the mass flow rate to 0.072 pounds mass per second.

Figure 10:
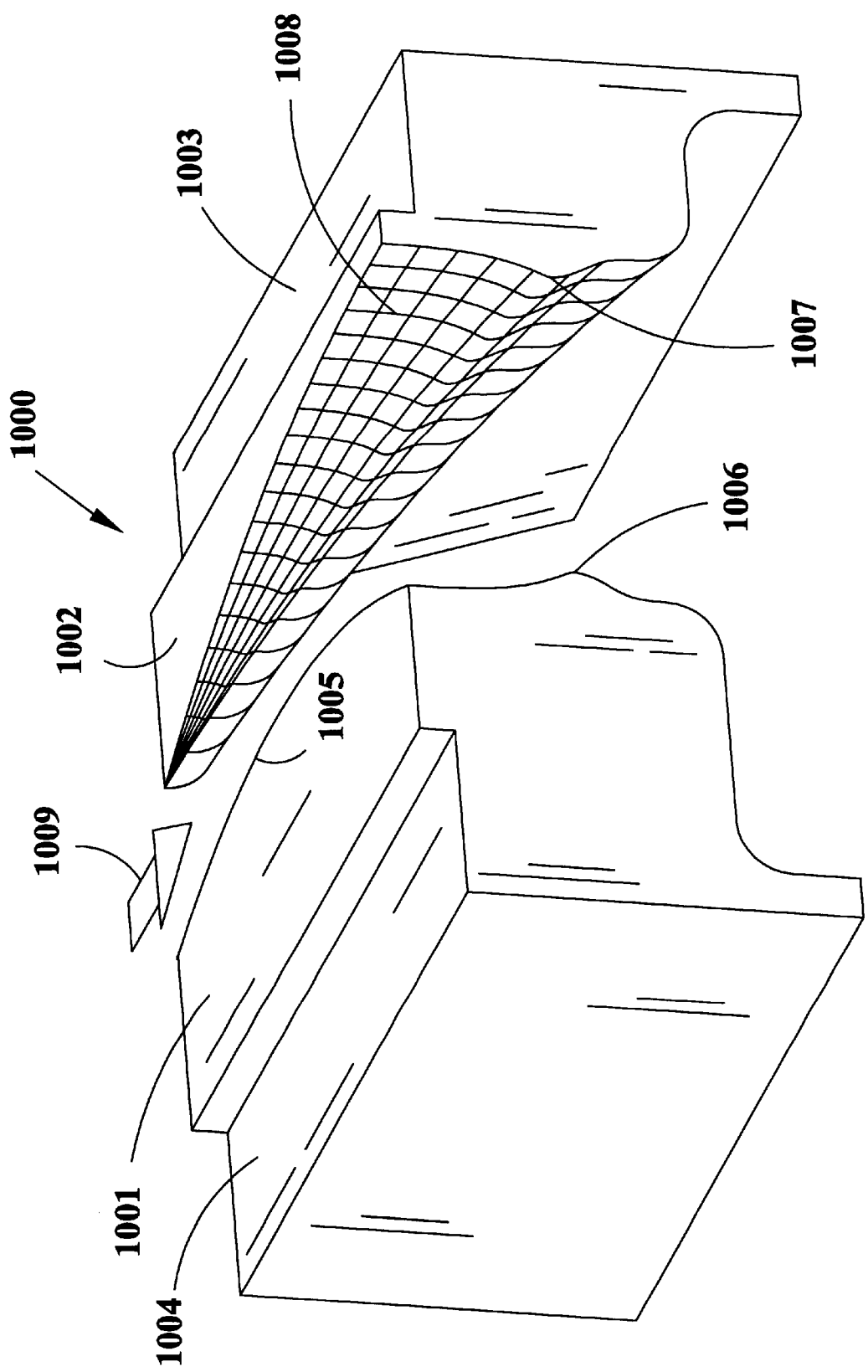
FIG. 10 is a perspective view of another embodiment of the invention illustrating a curved injector.

FIG. 10 is a perspective view 1000 of another embodiment of the invention illustrating a curved 1005 injector with the starboard 1002 and port 1001 blocks spaced apart for the purpose of illustration. As with straight line injectors, shoulders 1003 and 1004 enable flush mounting of the injector to the combustor. A venturi is formed between surface 1006 on port block 1001 and surface 1007 on starboard block 1007. Lines 1008 represent the stepover machining process and are not visible or present in the machined part. Curved injectors are also Mach number specific. In other words, a family, series or plurality of curved injectors may be used to accommodate an engine operating over a wide range of conditions, for example, different Mach numbers, temperatures, pressures and densities.

Figure 11:
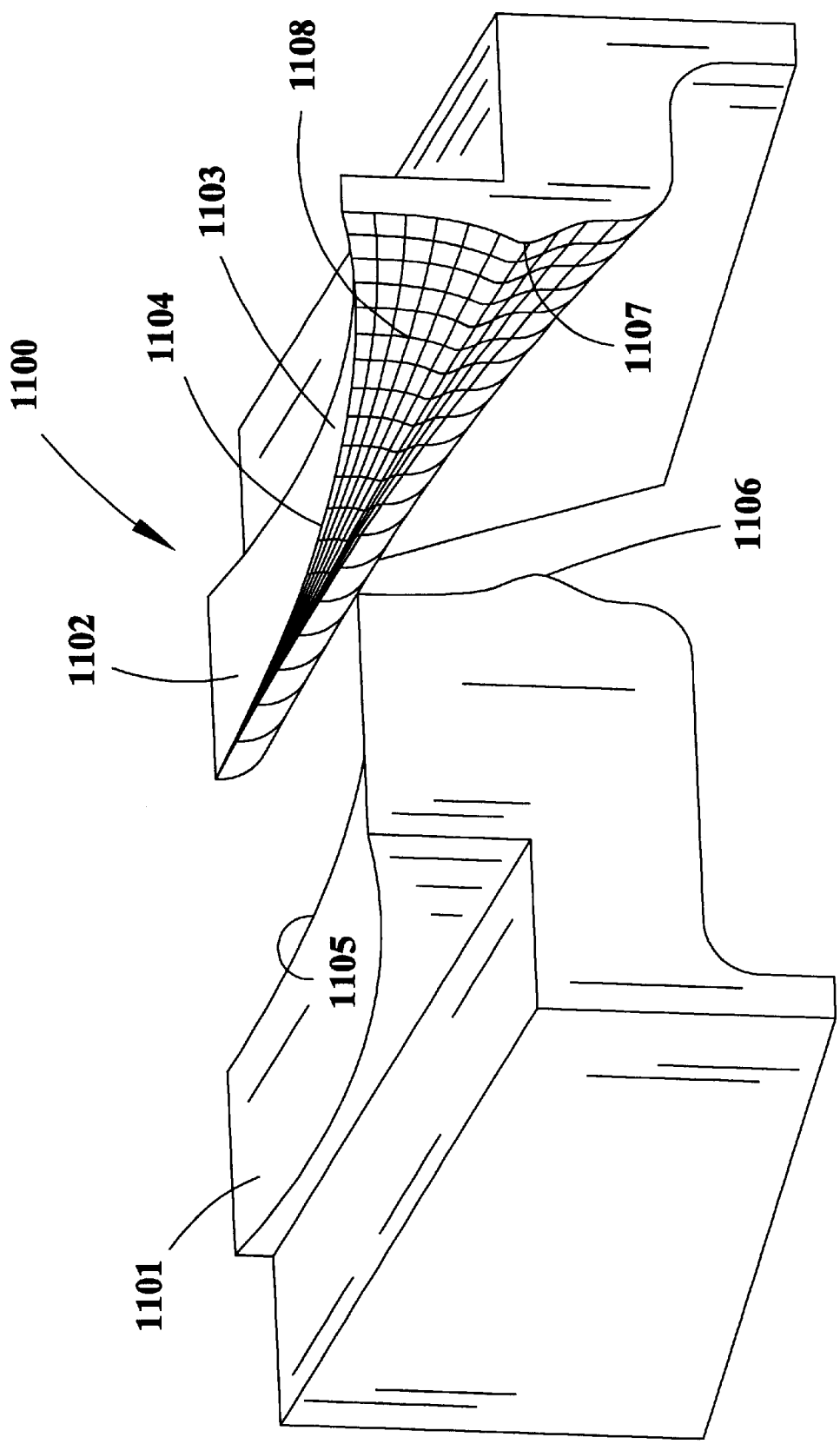
FIG. 11 is another embodiment of the invention illustrating another curved injector.

FIG. 11 is another embodiment of the invention illustrating a perspective view 1100 of another curved injector for mounting in a concave surface 1103 with the starboard block 1102 and the port block 1101 spaced apart for the purpose of illustration. Reference numerals 1104 and 1105 signify the curved opening in the concave surface 1103. Surfaces 1106 and 1107 form the throat of the injector. Lines 1108 are not visible in the actual structure but represent machining contours.

Figure 12:
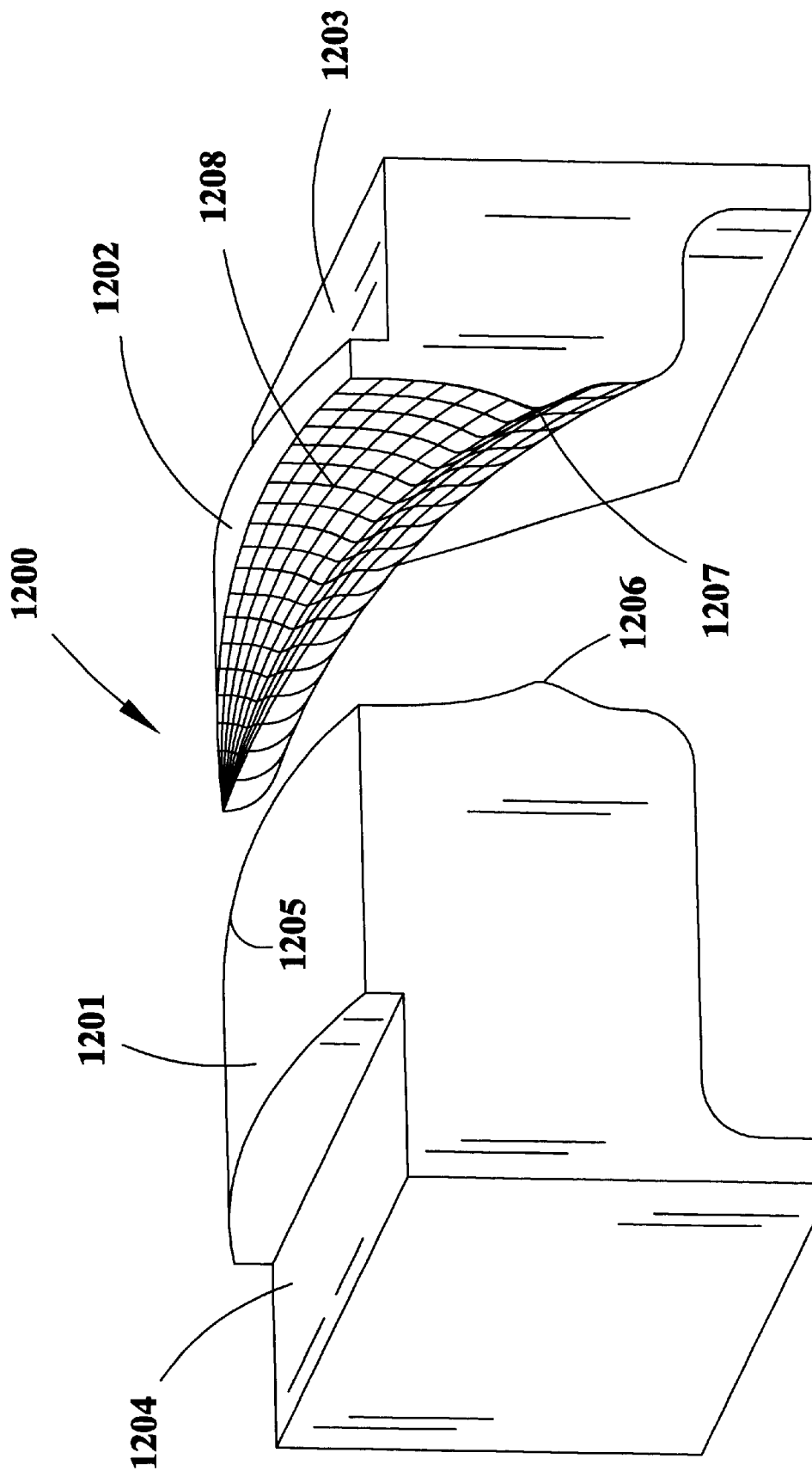
FIG. 12 is another embodiment of the invention illustrating another curved injector.

FIG. 12 is a perspective view 1200 of the invention illustrating another curved 1205 injector in the convex surface 1201 of the port block and the convex surface 1202 in the starboard block. Shoulders 1203 and 1204 enable flush mounting in the combustor chamber. Surfaces 1206, 1207 form the throat of the injector. Lines 1208 are not visible in the actual structure but represent machining contours.

Figure 13:
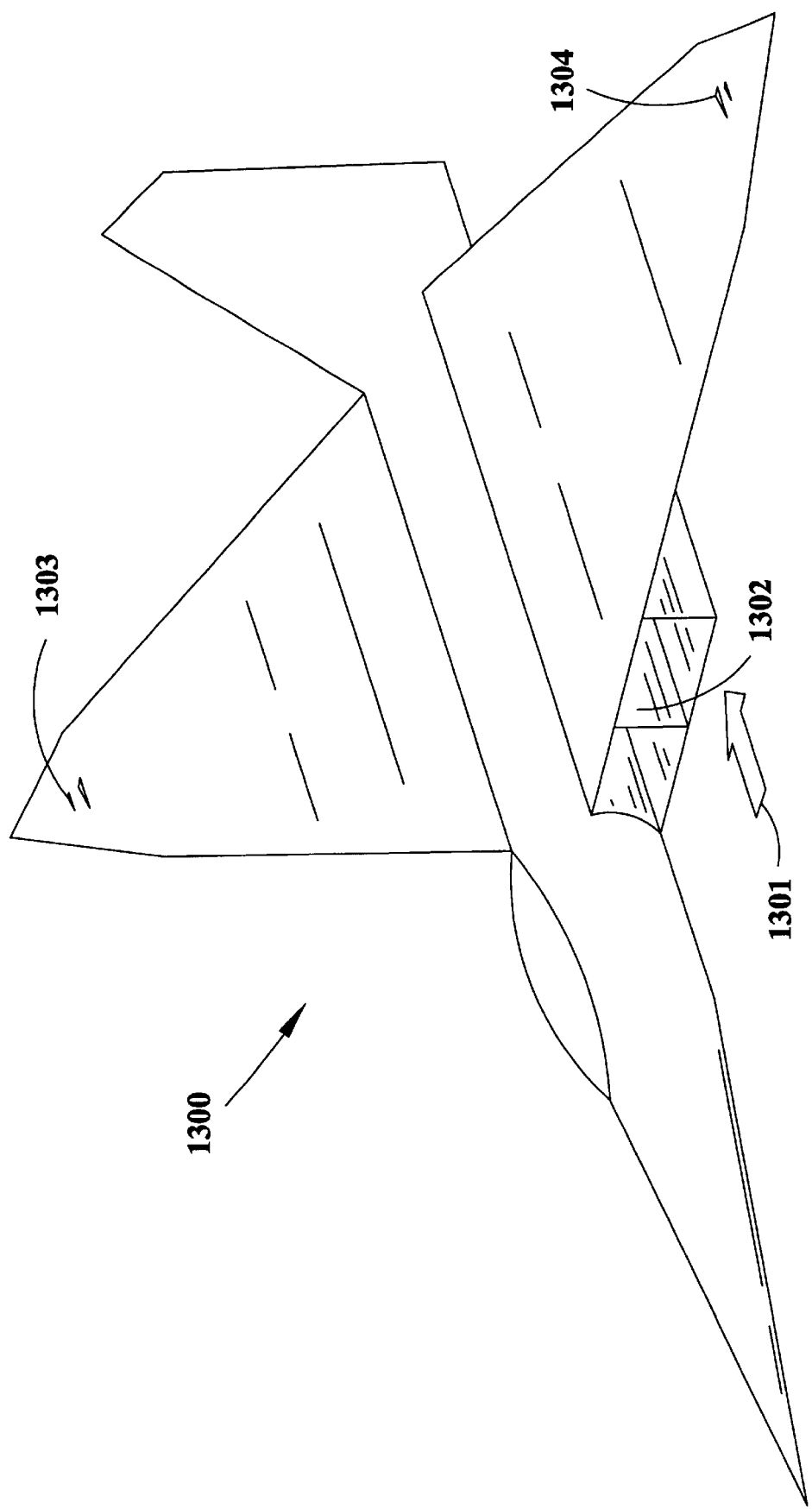
FIGS. 13 and 14 illustrate strut-jet applications for the injectors of the present invention.

FIG. 13 illustrates a strut-jet application 1300 for the injectors of the present invention. Arrow 1301 is an arrow indicating air flow toward the scram jet engine's inlet combustor 1302. Injectors 1303 and 1304 are illustrated for use in the attitude control of the spaceplane as there is no air in space against which a control surface may operate.

Figure 14:
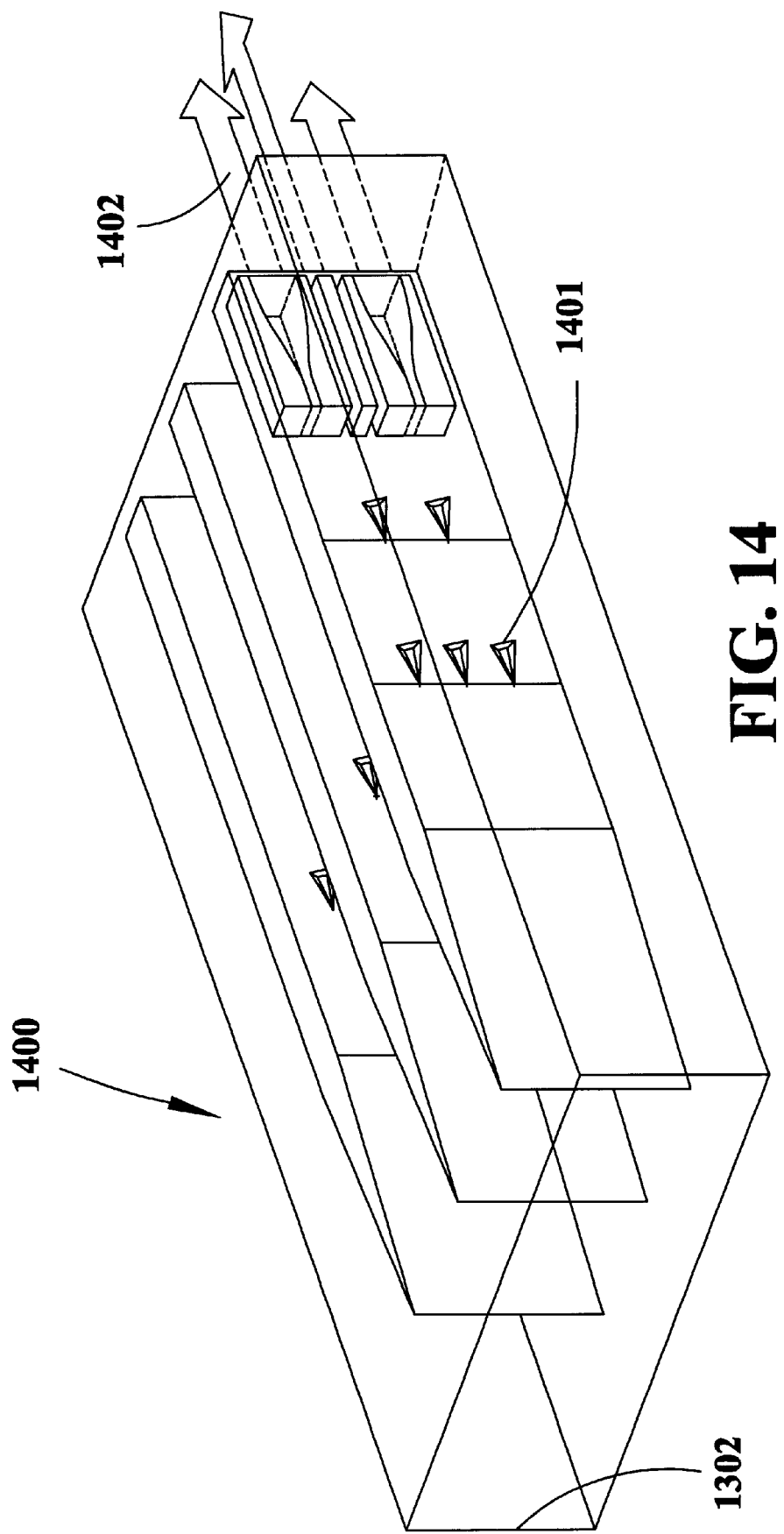

FIG. 14 illustrates an enlargement of the air breathing scram jet engine inlet/combustor with injectors 1401 and start-up propulsion systems 1402 diagrammatically illustrated.

Figure 15:
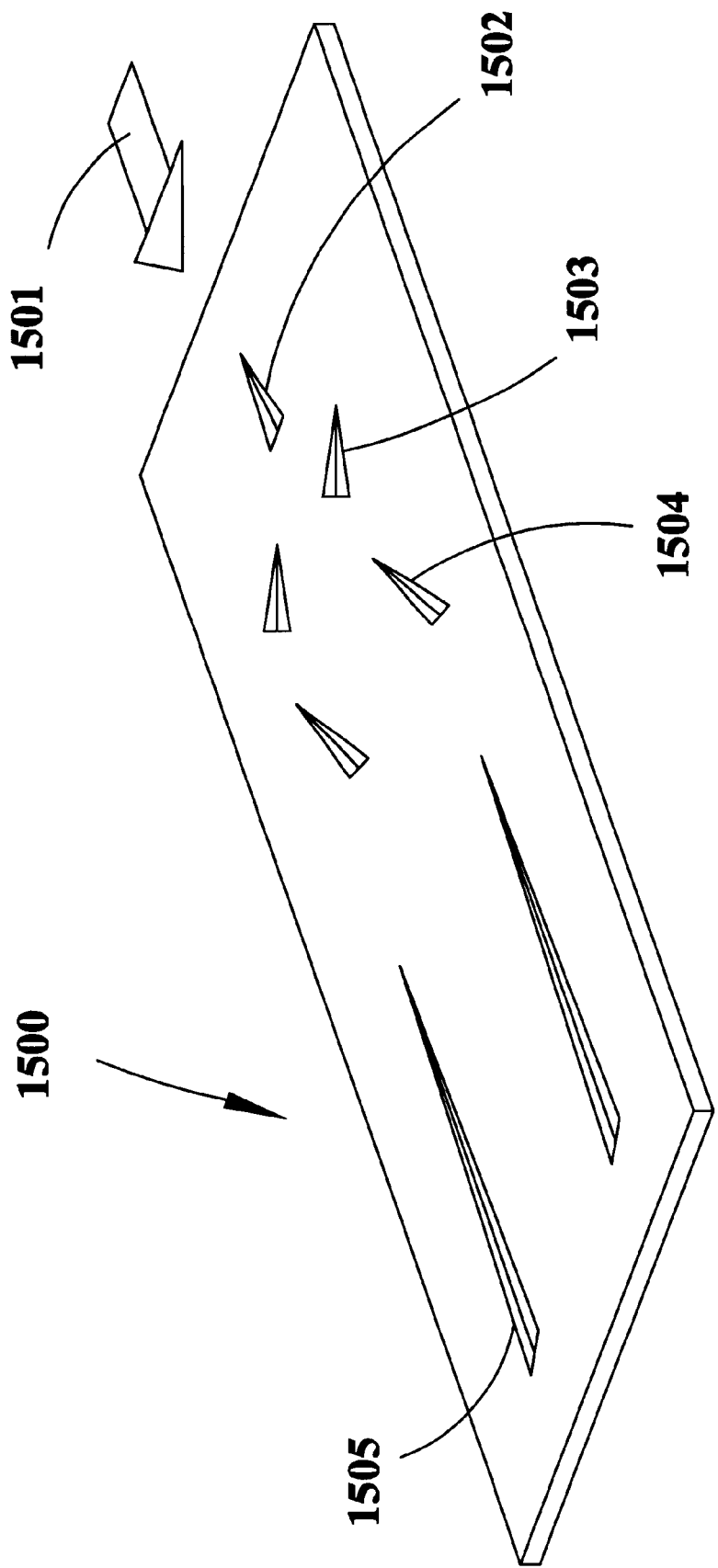
FIG. 15 illustrate grouping, angular orientation and flow straightening injectors; and, FIG. 16 illustrate straight grouping, curved and arced injectors.

FIG. 15 illustrates 1500 grouping, angular orientation and flow straightening injectors. Arrow 1501 indicates the direction of the combustion air flow. Straight injector 1502 is followed by a first row 1503 of injectors which are angled with respect to the flow. A second row of injectors 1504 are angled in the direction opposite of the first row of injectors. A fractional Mach 4 injector 1505 follows the second row of injectors. The fractional injector 1505 has less throat and accordingly injects less mass in the cross flow.

Figure 16:
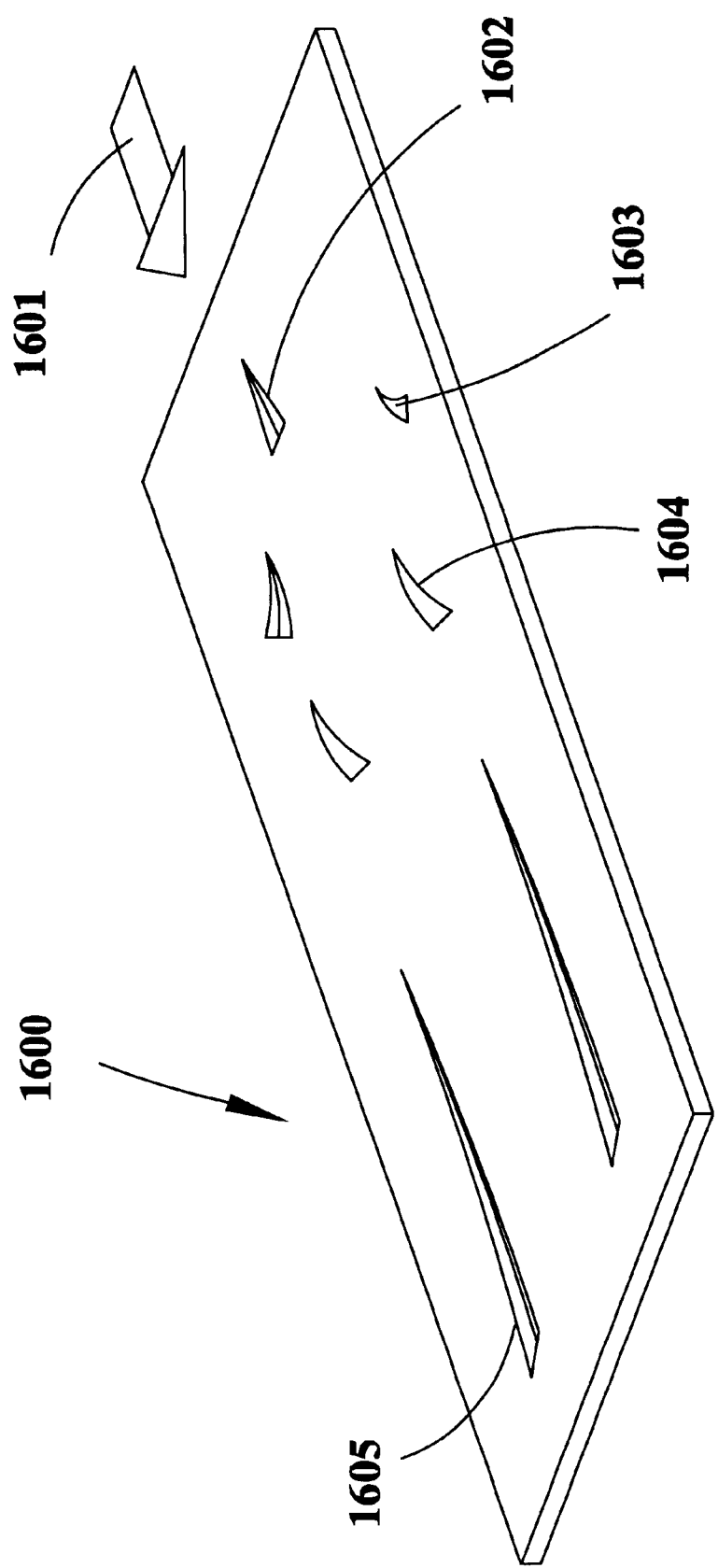

FIG. 16 illustrates another grouping 1600 of straight 1602, curved 1603, 1604 and arced 1605 injectors. Arrow 1601 indicates the direction of air flow. Various arrangements of the injectors may be used to obtain better mixing and better penetration and, hence, better combustion. Straight line elements may be followed by curved or angled injectors arranged in rows. The penetration from the first row is further lifted by displacement by the second row or groupings while undergoing augmented mixing by the counter swirl patterns setup by the second row.

While the invention has been described in detail herein those skilled in the art will readily recognize that changes and modifications may be made to the invention without departing from the spirit and scope of the appended claims.

We claim:

1. A fuel injector comprising: an elongated body; said elongated body having an opening therein; and, said opening having a substantially hour-glass shape in cross section.

2. A fuel injector as claimed in claim 1 wherein said elongated body further includes a bow section and a stern section and said opening having a substantially hour-glass shape in cross section extends from said bow section to said stern section.

3. A fuel injector as claimed in claim 2 wherein said opening having a substantially hour-glass shape in cross section has a width and said width diverges from said bow section to said stern section.

4. A fuel injector as claimed in claim 3 wherein said opening having a substantially hour-glass shape in cross section has a depth and said depth diverges from said bow section to said stern section.

5. A fuel injector as claimed in claim 4 wherein said elongated body comprises a port half and a starboard half and said opening having a substantially hour-glass shape in cross section includes a throat area which diverges from said bow section to said stern section.

6. A fuel injector as claimed in claim 5 further comprising a first strap and a second strap, said first strap affixed to said bow section of said injector and said second strap affixed to said stern section of said injector, said first and second straps space said port and starboard halfs apart so as to control said throat area and to slightly vary the specific injectant velocity from said opening having a substantially hour-glass shape in cross section.

7. A fuel injector as claimed in claim 1 wherein said elongated body is comprised of 2124 Aluminum.

8. A fuel injector as claimed in claim 1 wherein said elongated body includes a concave surface.

9. A fuel injector as claimed in claim 1 wherein said elongated body includes a convex surface.

10. A fuel injector as claimed in claim 1 wherein said elongated body includes a curved opening.

11. A fuel injector as claimed in claim 1 wherein said elongated body includes a concave surface.

12. A fuel injector as claimed in claim 1 wherein said elongated body includes a convex surface.

13. A fuel injector as claimed in claim 2 wherein said stern section of said elongated body includes a stern wall; and, said stern wall being angled in the direction of the flow of the combustion air so as to substantially eliminate any disturbance of said injector when not in use.

14. A fuel injector for a combustor comprising: an elongated body; said elongated body being flush mounted to said combustor; said elongated body having an opening therein; and, said opening having a substantially venturi shape in cross section.

15. A fuel injector for a combustor as claimed in claim 14 wherein said elongated body further includes a bow section and a stern section and said opening having a substantially venturi shape in cross section extends from said bow section to said stern section.

16. A fuel injector for a combustor as claimed in claim 15 wherein said opening having a substantially venturi shape has a width and said width diverges from said bow section to said stern section.

17. A fuel injector for a combustor as claimed in claim 16 wherein said opening having a substantially venturi shape opening has a depth and said depth diverges from said bow section to said stern section.

18. A fuel injector for a combustor as claimed in claim 17 wherein said elongated body comprises a port half and a starboard half and said opening having a substantially venturi shape in cross section includes a throat area which diverges from said bow section to said stern section.

19. A fuel injector for a combustor as claimed in claim 18 further comprising a first strap and a second strap, said first strap affixed to said bow section of said injector and said second strap affixed to said stern section of said injector, said first and second straps space said port and starboard halves apart so as to control said throat area and to slightly vary the specific uniform injectant velocity from said opening having a substantially venturi shape in cross section.

20. A fuel injector for a combustor as claimed in claim 14 wherein said elongated body is selected from the group of 2124 Aluminum, investment cast metal, vapor deposited metal or ceramics.

21. A fuel injector for a combustor as claimed in claim 14 wherein said elongated body includes a concave surface.

22. A fuel injector for a combustor as claimed in claim 14 wherein said elongated body includes a convex surface.

23. A fuel injector for a combustor as claimed in claim 14 wherein said elongated body includes a curved opening.

24. A fuel injector flush mounted in a combustor comprising an elongated body having proximate and distal portions; said elongated body includes an opening having a substantially hour-glass shape in cross section; said opening includes a width and a depth; and, said width and depth of said opening increases from said proximate portion to said distal portion.

25. A fuel injector flush mounted in a combustor as claimed in claim 24 comprising a starboard half and a port half.

26. A fuel injector mounted in a combustor as claimed in claim 25 wherein said elongated body comprises a port half and a starboard half and said opening includes a throat area.

27. A fuel injector for a combustor as claimed in claim 26 further comprising a first strap and a second strap, said first strap affixed to said bow section of said injector and said second strap affixed to said stern section of said injector, said first and second straps space said port and starboard halves apart so as to control said throat area of said opening and slightly vary the specific uniform injectant performance parameters of velocity, mass flow, momentum flux ratio J, plume penetration, plume width and diffusion.

28. A fuel injector as claimed in claim 27 wherein said stern section of said elongated body includes a stern wall; and, said stern wall being angled in the direction of the flow of combustion air so as to substantially eliminate any disturbance of said injector when not in use.

29. An oxidizer or fuel injector system for injecting oxidizers or fuel into a supersonic cross flow having a specific Mach number, comprising: a plurality of Mach number specific injectors; each of said Mach number specific injectors having an elongated body having bow and stern sections; each of said elongated bodies of said Mach number specific injectors having an opening therein whose cross section is venturi shaped; each of said openings of said elongated bodies diverging from said bow to said stern; and, a selected one or a selected group of said Mach number specific injectors injecting oxidizer or fuel into said supersonic cross flow with uniform velocity from bow to stern such that the Mach number of said selected one or selected group number of said Mach number specific injectors approximately matches the Mach number of said supersonic cross flow or for specific propulsion system applications be significantly higher than the Mach number of the combustor's or rocket's supersonic cross flow.

* * * * *